(12) United States Patent
Zhang et al.

(10) Patent No.: US 7,827,305 B2
(45) Date of Patent: Nov. 2, 2010

(54) DETERMINATION OF A STATE OF FLOW THROUGH OR A CUT OF A PARAMETERIZED NETWORK

(75) Inventors: Bin Zhang, Fremont, CA (US); Julie Ward Drew, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1533 days.

(21) Appl. No.: 11/159,454

(22) Filed: Jun. 22, 2005

(65) Prior Publication Data

US 2006/0291390 A1  Dec. 28, 2006

(51) Int. Cl.
*G06F 13/00* (2006.01)
(52) U.S. Cl. ...................................................... 709/238
(58) Field of Classification Search .................. 709/238
See application file for complete search history.

(56) References Cited

U.S. PATENT DOCUMENTS 6,862,731 B1    3/2005    Roth et al.
6,885,641 B1 *  4/2005    Chan et al. ................... 370/252
2005/0018611 A1 * 1/2005  Chan et al. ................... 370/241

OTHER PUBLICATIONS

Hochbaum, D. Selection, provisioning, shared fixed costs, maximum closure and implications on algorithmic methods today. Mar. 14, 2004. University of California, Berkeley.
Gallo, G. et al., "A Fast Parametric Maximum Flow Algorithm and Applications," SIAM J. Comput., vol. 18, No. 1, pp. 30-55, Feb. 1989.

* cited by examiner

*Primary Examiner*—Robert B Harrell

(57) ABSTRACT

Provided are techniques for determining a state of flow through, or a cut of, a network in which some the capacities of at least some of the conduits are dependent upon a specified parameter. Initially, a derived network is obtained by replacing capacities in the original network that depend upon the parameter. A particular flow state then is identified for that derived network, and this flow state is used to determine either a state of flow through or a cut of the original network.

32 Claims, 5 Drawing Sheets

US 7,827,305 B2

DETERMINATION OF A STATE OF FLOW THROUGH OR A CUT OF A PARAMETERIZED NETWORK

FIELD OF THE INVENTION

The present invention pertains to the analysis of networks having a number of nodes interconnected by paths (or conduits) for conducting flows. It is particularly applicable to the determination of a state of flow through, or a cut of, a network where the capacities of some of the interconnecting conduits are functions of a specified parameter.

BACKGROUND

A great deal of effort has been directed to analyzing networks in which flows of various types (e.g., fluids, electricity or representational quantities) move from node to node through conduits having specified capacities. For example, it is well known that it often is desirable to identify the "minimum cut" of, and/or the "maximum flow" through, such a network. However, obtaining such information often is very time-consuming and computationally expensive, particularly when analyzing very large networks, and particularly when the conduit capacities are not fixed but rather depend upon a specified parameter and one wishes to identify the entire set of minimum cuts and/or maximum flows across all (or at least a range of) values for the parameter.

DESCRIPTION OF THE PREFERRED EMBODIMENT(S)

Figure 1:
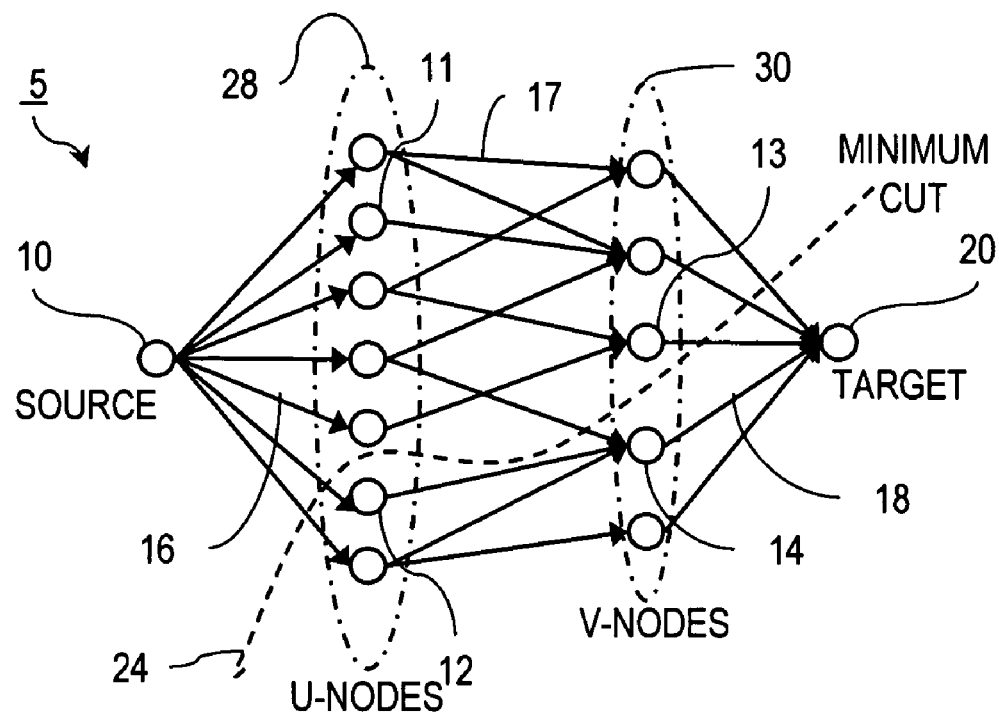
FIG. 1 illustrates an exemplary network that may be analyzed according to representative embodiments of the present invention.

FIG. 1 is a diagram of a sample network 5 for conducting flows (which, as noted below, might be actual physical quantities, such as fluids or electricity, or might be representative of other types of quantities). In network 5, flows originate at a source node 10 and then flow through a variety of intermediate nodes, such as nodes 11-14, interconnected by conduits, such as conduits 16-18, before arriving at target node 20.

Each of the conduits in network 5 may have a fixed capacity, such as 10 liters per minute, or may have a capacity that is a function of a specified parameter, e.g., $\lambda$. In the networks that are of primary concern in the present invention, at least some of the conduits have such parameter-dependent capacities. Such networks are referred to herein as parameterized networks.

In certain cases, the network description (sometimes simply referred to herein as a network) directly corresponds to an existing or a planned physical network for conducting flows (e.g., of fluids). In others, such a network is representative of a significantly different type of physical problem to be solved. For example, the flows may be representative of dollars.

For instance, network 5 (in FIG. 1) is an example of a bipartite network. A bipartite network is a network characterized by: a number of "u-nodes" (e.g., nodes 11 and 12), each being directly connected to a source node (e.g., node 10 in FIG. 1) by a single conduit; a number of "v-nodes" (e.g., nodes 13 and 14 in FIG. 1), each being directly connected to a target node (e.g., node 20 in FIG. 1) by a single conduit; no conduits between pairs of u-nodes or between pairs of v-nodes; and only conduits (no other nodes) between the u-nodes and the v-nodes.

It is known that a bipartite network can be used to model a number of physical (or concrete) planning problems. Some of the best-known are: (i) selection of an optimal set of components, where each component has a cost and where identified benefits sometimes are achieved only when specified combinations of the components have been selected; and (ii) optimal extraction approaches, e.g., in open-pit mining, where each potential block to be removed has an associated value, but where that value often can only be achieved by removing certain other blocks.

At least one of two important questions conventionally arises in connection with the flow networks described above. First, one often would like to know what the maximum flow through a given network can be. Second, particularly with respect to the types of problems mentioned in the preceding paragraph, a "minimum cut" of the network often is desired. A cut is a set of conduits whose removal disconnects the source node from the target node (i.e., after those conduits are removed, there is no longer a directed path from the source node to the target node). A cut divides the nodes in the network into two sets, an s-set (nodes that can be reached from the source node) and a t-set (nodes from which the target node can be reached). A minimum cut is a cut of minimum capacity, i.e., the sum of capacities of conduits in the cut is minimal. As is well-known, such a minimum cut often can provide, e.g., an optimal selection of components (in terms of net benefit), by essentially cutting away non-optimal portions of the network.

It has been shown that there is a relationship between minimum cut and maximum flow. Specifically, the sum of the capacities of the conduits contained in a minimum cut of a network is equal to the maximum flow within that network. An example of a minimum cut is minimum cut 24, which divides nodes in network 5 into two sets, one that includes source node 10 and one that includes target node 20.

The present invention recognizes that it often is desirable to obtain the complete relationship between either maximum flow or minimum cut, on the one hand, and the parameter $\lambda$, on the other, with respect to a given parameterized network having at least some capacities that are a function of parameter $\lambda$.

Once such information has been obtained, more intelligent planning decisions can be made, e.g., regarding the selection of $\lambda$, the identification of products to continue manufacturing on a go-forward basis, scheduling, etc. However, prior to the present invention, there has been no way known to the present inventors that is as quick or efficient for determining this entire set of relationships, at least with respect to any problem of significant complexity. In fact, calculating maximum flow or minimum cut for even a single value of λ often is computationally expensive using conventional techniques, particularly for large data sets, consisting of hundreds of thousands of nodes and millions of conduits.

One specific application of the present invention is the identification of an optimal set of products to manufacture (or otherwise procure) for sale, where demand for one product often is dependent upon the availability of another product (meaning that certain sales might only occur if the correct combination of products is available). This sometimes is referred to herein as a "revenue coverage" optimization problem. Such a problem can be modeled by providing: a u-node for each product currently being sold; a v-node for each historical sales transaction; an arc from the source node to each u-node, having a capacity that is equal to some defined penalty (e.g., cost) for continuing to offer the corresponding product for sale; arcs having infinite capacity from the products included in each order to the v-node corresponding to the order; and an arc from each v-node to the target node, having a capacity equal to the revenue arising from the corresponding order. Preferably, no other arc or node is included in the network description for modeling the foregoing problem.

As discussed in more detail below, the present invention provides techniques that often can be used to determine minimum cut or maximum flow for a parameterized network across the entire range of possible λ values. Moreover, in at least some cases the present invention can accomplish this result within a timeframe that is equivalent to, or even shorter than, the amount of time required to determine minimum cut or maximum flow for a single λ value when using a conventional technique.

Certain notations and concepts used in this disclosure are now discussed. Throughout the following disclosure, conduits in a network frequently are referred to as arcs, particularly with reference to graphical representation of the network, and nodes in a network often are referred to as vertices.

A network $\Omega=\{N,E,C,F\}$ preferably is represented as a finite directed graph $G(N,E)$, a set $C=\{c_{i,j} \geq 0 | i \neq j; i,j=1,\ldots,n\}$ of capacities of the arcs in E, and a set of flows $F=\{f_{i,j}|c_{i,j} \geq f_{i,j} \geq 0; i \neq j; i,j=1,\ldots,n\}$ through the arcs. Often, a missing arc between an ordered pair of vertices is represented by an arc with a zero capacity. With this understanding, E is not necessary in the network notation—$\Omega=\{N,C,F\}$. Sometimes it is convenient to sub-index capacities and flows by vertices directly, like $c_{w,w'}$ or $f_{w,w'}$.

$N=\{s,t\} \cup \{w_i\}_{i=1}^{n}$ preferably contains two special vertices—the source s with only outgoing arcs and the target t with only incoming arcs.

Flows preferably are balanced at each vertex w other than s and $$t: \sum_{w' \neq w} f_{w,w'} = 0 \text{ for } \forall w \in N \setminus \{s, t\}.$$

In the preferred embodiments, no multiarcs (arcs with the same head and the same tail) or loops are present in E. The commonly used assumption $-f_{j,i}=f_{i,j}$ is followed.

Working with increments of flows, it often is more convenient to look at the remaining capacity of an arc, $\hat{c}_{i,j}=c_{i,j}-f_{i,j}$, called residual capacity. When an arc $(w_i,w_j)$ carries a positive flow, reducing that flow is the same as adding a reversed flow to it; preferably, the maximum amount of reversed flow allowed is equal to the current forward flow, which is called the residual capacity of the reversed arc: $\hat{c}_{j,i}=f_{i,j}$. $\hat{C}=\{\hat{c}_{i,j}|i,j=1,\ldots,n\}$, the set of residual capacities.

A residual network is the network $\hat{\Omega}=\{N,\hat{C},F\}$. A residual arc is an ordered pair of vertices $(w_i,w_j)$ with positive residual capacity $\hat{c}_{w_i,w_j}>0$. A path in the residual network is called a residual path. The capacity along a residual path is the minimum residual capacity of the residual arcs in the path. An augmenting path is a path from the source to the target with positive residual capacity in the residual network.

An s-t-cut is a partition of N into two disjoint subsets, an s-partition containing s and a t-partition containing t. As noted above, one representative example is cut 24 in FIG. 1. The capacity of an s-t-cut is the sum of the capacities of the arcs from a vertex in the s-partition to a vertex in the t-partition. A minimum cut is an s-t-cut with minimum capacity among all s-t cuts. The maximum flow of a network is the maximum amount of flow possible from the source node to the target node. The max-flow-min-cut theorem states that the maximum flow in a network is equal to the capacity of its minimum cut.

Technique for Bipartite Networks.

We first consider the case of a class of parametric bipartite networks in which the capacities of at least some of the arcs (e.g., arc 16 in network 5 of FIG. 1) leaving the source node (s) (e.g., node 10 in FIG. 1) are non-decreasing functions of the parameter λ, the capacities of at least some of the arcs (e.g., arc 18 in FIG. 1) entering the target node (t) (e.g., node 20 in FIG. 1) are non-increasing functions of the parameter λ, and the capacities of remaining arcs are constant. In this class of networks, it is conventionally known that the minimum cuts for an increasing sequence of parameter values $\lambda_1 < \lambda_2 < \ldots$ are nested, meaning that for increasing λ values, the series of t-sets associated with the increasing series of parameters is nested, i.e., the first t-set contains the second t-set which contains the next t-set, etc.

As noted above, a parametric network $\Omega=\{N,E,C_\lambda,F\}$ is a network with some of its capacities depending on a parameter λ. Two disjoint subsets of vertices are named separately as $U=\{u_i|i=1,\ldots,n_1\}$ (e.g., subset 28 in network 5 of FIG. 1) and $V=\{v_l|l=1,\ldots,n_2\}$ (e.g., subset 30 in network 5 of FIG. 1). $N=\{s,t\} \cup W$ and $W=U \cup V$.

An arc exists from s to every vertex in U and from every vertex in V to t. Arcs between U and V may go in either direction.

$$E=\{(s,u_i)\}_{i=1}^{n_1} \cup \{(v_j,t)\}_{j=1}^{n_2} \cup \{(w,w')|w \in U, w' \in V; \text{ or } w' \in U, w \in V\}.$$

Capacities on the arcs between the vertices in W are non-negative constants: $c_{i,j} \in [0,+\infty]$, $i \neq j, i, j=1,\ldots,n$. At least where the conduit (or arc) is a function of λ, capacity from s to any $u \in U$ is a continuous strictly monotone increasing function of λ, and from any $v \in V$ to t a continuous strictly monotone decreasing function of λ, where $\lambda \in [a,b]$, if $a=-\infty$ and/or $b=+\infty$, and the value of the capacity at infinity is defined by the limit, which exists and can be infinity. Under these assumptions, the inverse functions of the capacities exist, are continuous and monotone.

Based on the max-flow-min-cut theorem, the maximum flow under a fixed λ is equal to the capacity of a minimum cut $(N_s,N_t)$.

Figure 2:
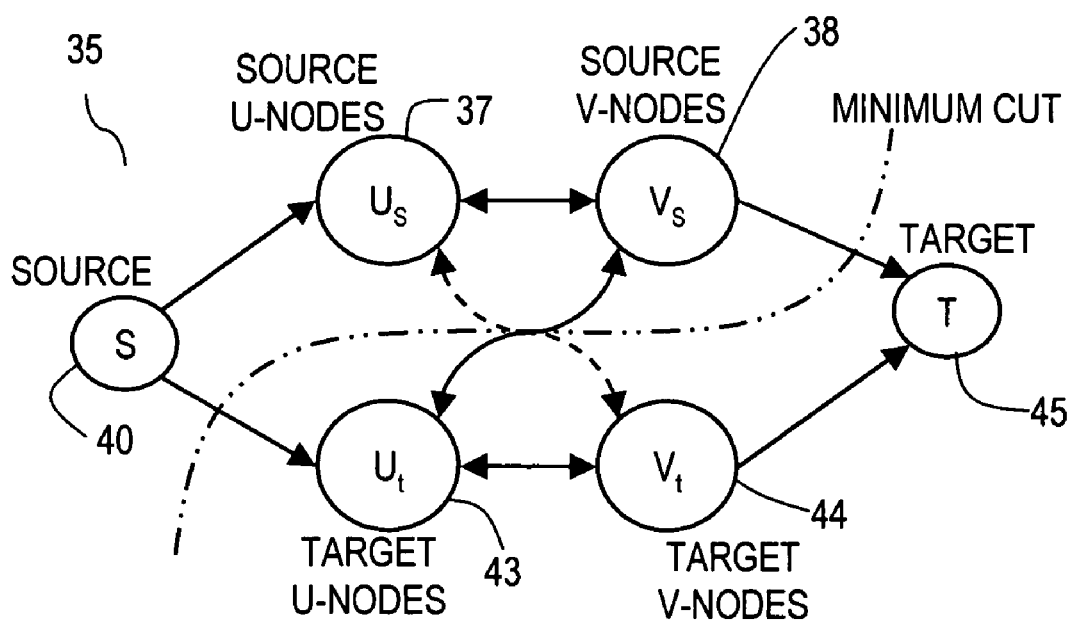
FIG. 2 illustrates an aggregated view of the minimum cut of an exemplary network that may be analyzed according to representative embodiments of the present invention.

FIG. 2 shows an aggregated view of a maximum flow/minimum cut solution 35, in which $U_s \subset U$ 37 and $V_s \subset V$ 38 are the vertices reachable from the source s 40 through residual arcs; $U_r=U\backslash U_s$ and $V_r=V\backslash V_s$. Correspondingly, $U_r$ 43 and $V_r$ 44 are the vertices from which the target t 45 can be reached.

The preferred technique according to the present invention primarily operates in the derived non-parametric network $\overline{\Omega}=\{N,E,\overline{C},\overline{F}\}$, described below, instead of the original parametric network. Unlike many conventional techniques, the technique of the present invention generally does not attempt to find the maximum flow in $\overline{\Omega}$, but instead finds a particular state of the flows in $\overline{\Omega}$. From this particular state of the flows, minimum cuts of the original network under all $\lambda$ typically can be identified in a single scan of the vertices in a particular order, concurrently with which the maximum flows also can be calculated from a single scan of the arcs. In many cases, as discussed in more detail below, the techniques described herein simultaneously discover all breakpoints of $\lambda$ at which the minimum cut changes.

The network $\overline{\Omega}=\{N,E,\overline{C},\overline{F}\}$ is derived from the original network $\Omega$ by keeping the same underlying graph and the capacities on the arcs between a pair of vertices in W, but replacing all of $\lambda$-dependent capacities on the arcs incident to the source s 10 or to the target t 20 by a constant value which, in the present embodiment, is $+\infty$ (although in alternate embodiments, a finite value is used). Accordingly, we have $$\overline{C}=\{\overline{c}_{i,l}=c_{i,l}|\forall(i,l)\}\cup\{\overline{c}_{s,i}=+\infty|\forall i\}\cup\{\overline{c}_{l,t}=+\infty|\forall l\}.$$

This notation makes the residual capacities in the residual network from $\overline{\Omega}=\{N,E,\overline{C},\overline{F}\}$ cumbersome to write. By convention, $$\hat{c}_{i,l}=\overline{c}_{i,l}-\overline{f}_{i,l}$$

but we sometimes use the simpler notation $\hat{c}_{i,l}=\overline{c}_{i,l}-\overline{f}_{i,l}$ when it does not cause confusion.

In the derived network of the present embodiment, flows through the formerly $\lambda$-dependent arcs incident to the source 10 or the target 20 are no longer constrained. What values the flows through these arcs (and other arcs in $\overline{F}$) will take is determined by the technique of the present invention. After removing all the $\lambda$-dependent capacities in $\Omega$, the derived network $\overline{\Omega}$ no longer depends on $\lambda$.

Figure 3:
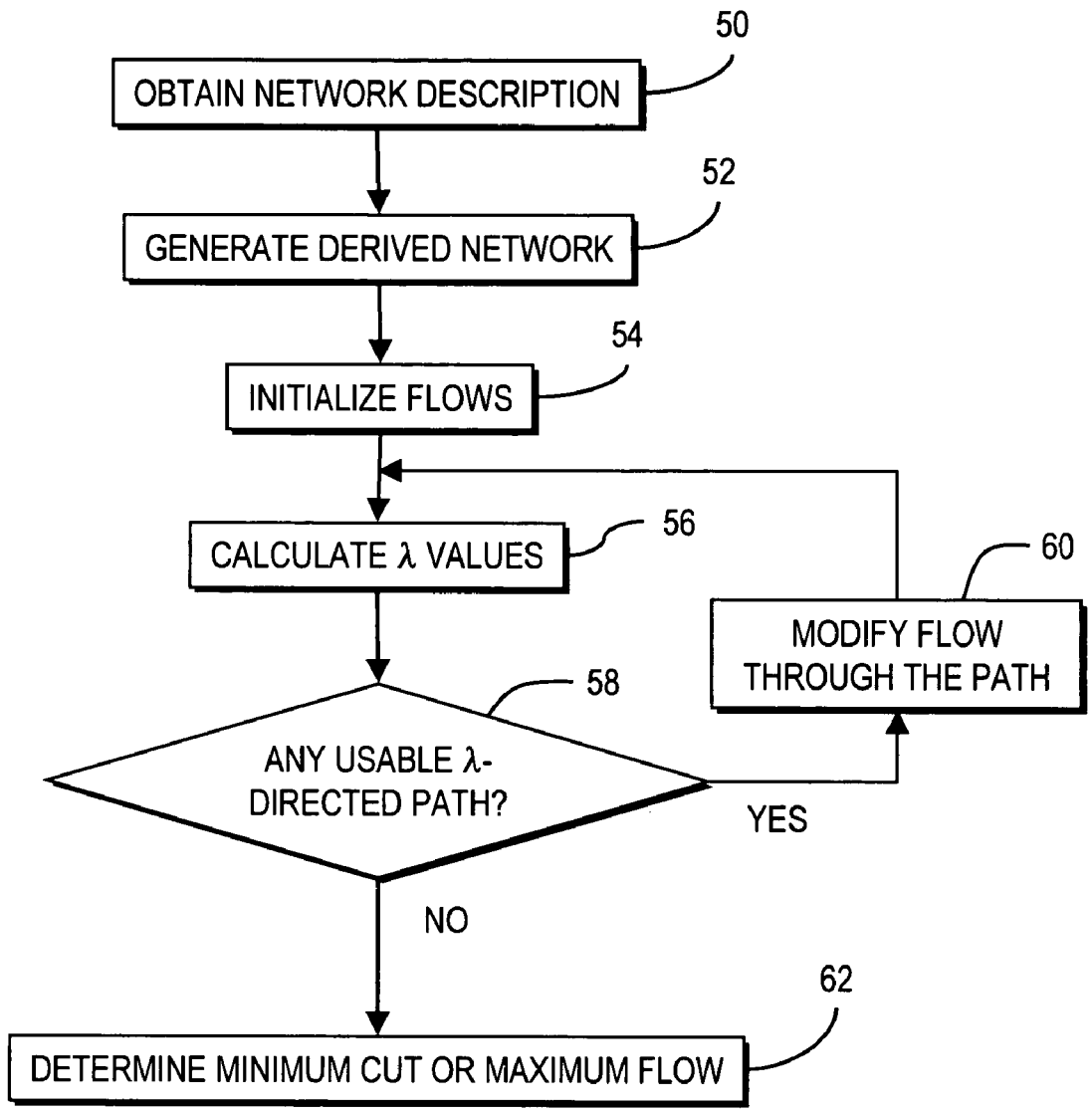
FIG. 3 illustrates a flow diagram for describing a technique, according to a representative embodiment of the present invention, for determining a minimum cut of, or the maximum flow through, a bipartite network.

FIG. 3 is a flow diagram illustrating a technique for determining a minimum cut of or the maximum flow through a bipartite network according to a representative embodiment of the present invention.

Initially, in step 50 a network description $\Omega$ is obtained. In one sub-embodiment, the network description upon which the present technique operates is simply a graphical representation of an actual physical network. In another sub-embodiment, the network description models a different type of physical problem for which a solution is desired. As noted above, and as discussed throughout the conventional literature, a variety of different problems may be modeled as a bipartite flow network. The techniques for producing the network description in any of the foregoing cases are well-known and therefore are not discussed here.

In step 52, a derived network $\overline{\Omega}$ is generated based on the network description obtained in step 50. As noted above, in the derived network preferably all conduits having $\lambda$-dependent capacities are replaced by conduits having $\lambda$-independent capacities. For this purpose, in the present embodiment all $\lambda$-dependent capacities are replaced with a single $\lambda$-independent quantity, infinity ($\infty$) in the current embodiment, or some single fixed finite capacity in an alternate sub-embodiment. In other alternate embodiments, at least some of the $\lambda$-dependent capacities are replaced with values that differ from conduit to conduit. For example, in one sub-embodiment the replacement capacity is the maximum expected capacity, based on the expected extremes in the $\lambda$ value. Other than the substitution of $\lambda$-dependent capacities with $\lambda$-independent capacities, the derived network preferably is identical to the network obtained in step 50. For the purpose of the following discussion, we will assume that all $\lambda$-dependent capacities are replaced with infinity.

In step 54, flows through the derived network are initialized. Any feasible flows in $\overline{\Omega}$ (including completely zero flows) may be used for this purpose.

In step 56, a $\lambda$ value is calculated for each conduit that was replaced in step 52. Specifically, the $\lambda$ value associated with each $u_i$, $i=1,\ldots,n_1$ or $v_l$, $l=1,\ldots,n_2$ (it being assumed that only the conduits from s to $u_i$ and from $v_l$ to t in the original network $\Omega$ may be $\lambda$-dependent, and using the designation of the corresponding u or v node to reference the conduit) preferably is calculated from the flow in $\overline{\Omega}$ using the inverse of the capacity function from the original network $\Omega$, as follows:

$$\lambda_{s,i}=c_{s,i}^{-1}(\overline{f}_{s,i}),\ i=1,\ldots,n_1\ \text{and}\ \lambda_{l,t}=c_{l,t}^{-1}(\overline{f}_{l,t}),$$
$$l=1,\ldots,n_2.$$

The inverse functions exist and result in a single value in the present embodiment because of the strict monotocity of $c_{s,i}(\ )$ and $c_{l,t}(\ )$.

In step 58, a determination is made as to whether any usable $\lambda$-directed residual path exists. Preferably, the following two types of residual paths are defined.

Type st: we call a residual path of this type $s\rightarrow u_i\rightarrow v_l\rightarrow t$ a simple $\lambda$-directed st-type residual path if $\lambda_{s,i}<\lambda_{l,t}$ and $\hat{c}_{i,l}>0$. In the present embodiment, it is always true that $$\hat{c}_{s,i}=+\infty\ \text{and}\ \hat{c}_{l,t}=+\infty.$$

Type ts: we call a residual path of this type $s\leftarrow u_i\leftarrow v_l\leftarrow t$ a simple $\lambda$-directed ts-type residual path if $\lambda_{s,i}>\lambda_{l,t}$ and $\hat{c}_{v_l,u_i}>0$. In the present embodiment, there is never the need to check $$\hat{c}_{t,l}>0\ \text{and}\ \hat{c}_{i,s}>0$$

because they are implied:

$$\hat{c}_{t,l}=0-\overline{f}_{t,l}=\overline{f}_{l,t}=c_{l,t}(\lambda_{l,t})>c_{l,t}(\lambda_{s,i})\geq 0$$

and $$\hat{c}_{i,s}=0-\overline{f}_{i,s}=\overline{f}_{s,i}=c_{s,i}(\lambda_{s,i})>c_{s,i}(\lambda_{l,t})\geq 0.$$

Even if a type st or type ts path exists, we generally still will want to determine whether or not it is usable. In this regard, for example, such a path might not be usable if it is impossible to push additional flow in the indicated direction because some other capacity constraint along the path already is at its maximum flow. See the discussion of step 60 below.

If any such usable $\lambda$-directed residual path is identified, then processing proceeds to step 60 (with respect to any one of such paths, if multiple such paths have been identified). Otherwise, the desired (or final) state of the derived network has been obtained in the present embodiment of the invention, and therefore processing proceeds to step 62. It is noted that in the present embodiment the repetition of modifying flows and recalculating λ values is repeated until there no longer is any usable λ-directed residual path. However, in an alternate embodiment a different condition is specified for terminating such repetition.

In step 60, flow quantity through the path identified in step 58 is modified, preferably using the following push technique. In the preferred sub-embodiment, a flow is always pushed from a vertex with a lower associated λ value to a vertex with a higher associated λ value. More preferably, each push attempts to eliminate the λ-directed residual path by filling up the residual capacity, if doing so does not reverse the order of the associated λ values. It is noted that if reversed, the path still will be a λ-directed residual path. Accordingly, subject to any other capacity or other constraints, preferably just enough flow is pushed to make the two associated λ values equal; this particular amount of flow δ is the solution to the following equation:

$$c_{s,i}^{-1}(\bar{f}_{s,i}+\delta)=c_{l,t}^{-1}(\bar{f}_{l,t}+\delta).$$

The foregoing equation always has a solution because as δ starts from zero and moves strictly in the direction that makes the two λ values $(\lambda_{s,i}=c_{s,i}^{-1}(\bar{f}_{s,i}+\delta)\epsilon[a,b]$ and $\lambda_{l,t}=c_{l,t}^{-1}(\bar{f}_{l,t}+\delta)\epsilon[a,b]$, which are both monotone functions of δ) closer, the smaller λ approaches b and the larger λ approaches a (<b). Accordingly, there must be a δ at which they cross each other, i.e. satisfying the above the equation. However, it is possible that there is another capacity constraint in the subject path that makes it impossible to increase δ adequately to satisfy the equation. In such a case, the λ differential can be reduced, but not eliminated, at least not in the current pass.

Upon completing this push (which may result in a reduction of flow, in the case of a negative push), processing returns to step 56. There, any λ values that have been affected by the flow modification of step 60 are recalculated based on the new flows, as follows: $\lambda'_{s,i}=c_{s,i}^{-1}(\bar{f}_{s,i}+\bar{\delta})$ and $\lambda'_{l,t}=c_{l,t}^{-1}(\bar{f}_{l,t}+\bar{\delta})$.

In step 62 (which is executed after it is determined that no usable λ-directed residual path remains), the minimum cut or maximum flow of the original network Ω is determined. Using the derived network $\bar{\Omega}=\{N,E,\bar{C},F\}$ with the flows given by the technique discussed above, a minimum cut of $\Omega=\{N, E,C_\lambda,F\}$ under any desired λ value preferably is derived in a single linear scan of the vertices. First, we partition vertices N into $(N_{s,\lambda}, N_{t,\lambda})$ as follows:

$N_{s,\lambda}=\{s\}\cup\{u_i|\lambda_{s,i}=c_{s,i}^{-1}(\bar{f}_{s,i})<\lambda\}\cup\{v_j|\lambda_{l,t}=c_{l,t}^{-1}(\bar{f}_{l,t})<\lambda\}$ and $N_{t,\lambda}=N\backslash N_{s,\lambda}$. That is, the nodes included in the minimum cut are all of the u-nodes whose conduit to s has a λ value that is less than the specified λ value and all of the v-nodes whose conduit to s has a λ value that is less than the specified λ value.

Putting the capacities $\{c_{s,i}(\lambda)|i=1, \ldots, n_1\}$ and $\{c_{l,t}(\lambda)|l=1, \ldots, n_2\}$ back into $\bar{\Omega}\{N,E,\bar{C},F\}$ by reducing the flows where capacities are violated, we recover the original network at parameter value λ with the maximum flow. For $u_i\epsilon U_{t,\lambda}$ with $\lambda\leq\lambda_{s,i}$, $c_{s,i}(\lambda)\leq c_{s,i}(\lambda_{s,i})=\bar{f}_{s,i}$ because $c_{s,i}(\lambda)$ is non-decreasing; these flows $\bar{f}_{s,i}$ are reduced. Without changing the flows from $N_{s,\lambda}\backslash\{s\}$ to $N_{t,\lambda}$, the reduced flows can be rebalanced at $U_{t,\lambda}$ by reducing the flows from $U_{t,\lambda}$ to $V_{t,\lambda}$ and rebalanced again at $V_{t,\lambda}$ by reducing flows from $V_{t,\lambda}$ to t.

Similarly, for $v_j\epsilon V_{s,\lambda}$ with $\lambda\leq\lambda_{l,t}$, $c_{l,t}(\lambda)\leq c_{l,t}(\lambda_{l,t})=\bar{f}_{l,t}$ because $c_{l,t}(\lambda)$ is non-increasing; these flows $\bar{f}_{l,t}$ are reduced. Without changing the flows from $N_{s,\lambda}$ to $N_{t,\lambda}\backslash\{t\}$, the reduced flows can be rebalanced at $V_{s,\lambda}$ by reducing the flows from $U_{s,\lambda}$ to $V_{s,\lambda}$ and rebalanced again at $U_{s,\lambda}$ by reducing flows from s to $U_{s,\lambda}$.

After the reductions and rebalancing, a maximum flow in the original network with minimum cut $(N_{s,\lambda}, N_{t,\lambda})$ is achieved. However, for the purpose of finding a minimum cut and the maximum flow under λ, there is in fact no need to carry out the reductions and rebalancing described above.

A single scan of the vertices in N in the increasing order of their associated λ values gives all minimum cuts as monotone increasing step set-function $N_{s,\lambda}$ of λ and the λ values at which the sizes of the minimum cut partitions change (the minimum cuts being nested). Sorting the vertices by their associated lambda value generally takes an additional O(n log(n)) time.

The set of λ values identified from the technique described above also represent all breakpoints of λ, i.e., where the minimum-cut changes (as a mapping from λ to a partition).

All maximum flow values of the original network preferably also are calculated, in additional O(m) time, where m is the number of arcs, if the arcs are also scanned concurrently with the scanning of the vertices. Since the minimum cuts are nested, each arc is encountered twice—once when one of its ends changes membership (from t-partition to s-partition) and its capacity from $N_{s,\lambda}$ to $N_{t,\lambda}$ is added to the maximum flow; and the second time when the other end changes its membership and its (previous) capacity from $N_{s,\lambda}$ to $N_{t,\lambda}$ is subtracted from the maximum flow.

Figure 4:
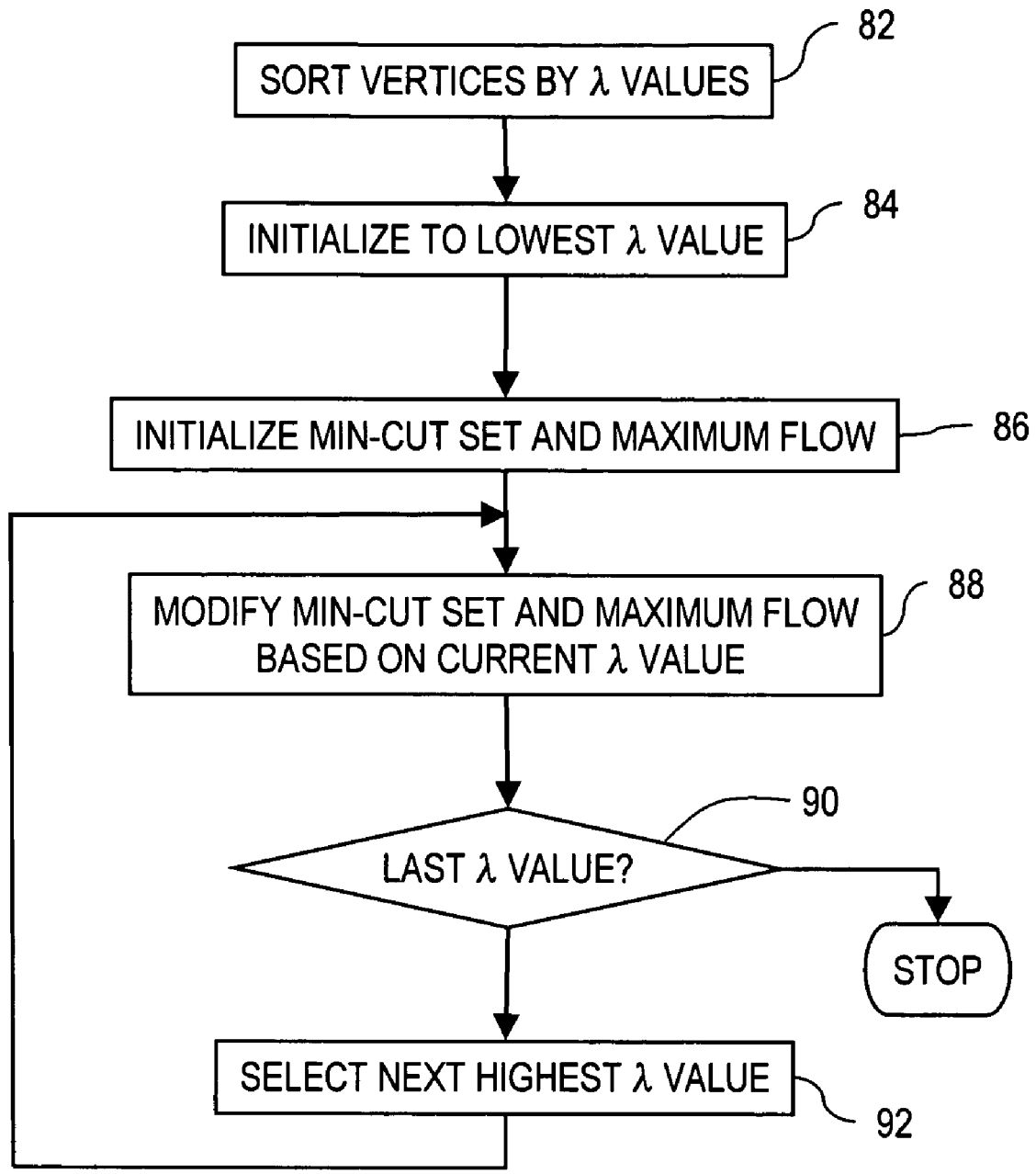
FIG. 4 illustrates a flow diagram for explaining a technique, according to a representative embodiment of the invention, for obtaining all minimum cuts and maximum flows of a network after having obtained a particular state for a derived network, e.g., where the derived network and its state have been obtained in accordance with the procedure illustrated in FIG. 3.

A procedure for obtaining all minimum cuts and the maximum flows (i.e., one technique for implementing step 62 above) over all λ values is now summarized with reference to FIG. 4. In the following discussion, there is no need to distinguish λ values associated with a vertex in U or a vertex in V. We therefore use the simpler notation $\{\lambda_i|i=1, \ldots, n\}$ for the set of lambda values.)

Initially, in step 82 the vertices in $N\backslash\{s,t\}$ are sorted by their associated lambda values $\lambda_i$, $i=1, \ldots, n$. For convenience, we assume that $\lambda_1\leq \ldots \leq\lambda_n$.

In step 84, the process initializes to the lowest λ value, i.e., sets i=1.

In step 86, the min-cut sets and the value of the maximum flow are initialized. Preferably, $N_{s,\lambda_i}=\{s\}$, $N_{t,\lambda_i}=N\backslash N_{s,\lambda_i}$, $flow_{max}=0$.

In step 88, the min-cut sets and the value of the maximum flow are modified based on the current $\lambda_i$ value. Preferably, $\Delta_i=\{w\epsilon W|\lambda_w=\lambda_i\}$; then, for $\forall w\epsilon\Delta_i$ and $\forall w'\epsilon\{w'|w'\epsilon N_{s,\lambda_i} \& c_{w',w}>0\}$, $flow_{max}=flow_{max}-c_{w',w}$; for $\forall w\epsilon\Delta_i$ and $\forall w'\epsilon\{w'|w'\epsilon N_{t,\lambda_i}\backslash\Delta_i \& c_{w,w'}>0\}$, $flow_{max}=flow_{max}+c_{w,w'}$; and $N_{s,\lambda_{i+1}}=N_{s,\lambda_i}\cup\Delta_i$, $N_{t,\lambda_{i+1}}=N\backslash N_{s,\lambda_{i+1}}$.

The value of $flow_{max}$ and $\Delta_i$ (the change in the sets) or the entire compositions of the sets $(N_{s,\lambda_{i+1}}, N_{t,\lambda_{i+1}})$, i.e., the maximum flow and the minimum cut for $\lambda\epsilon(\lambda_i, \lambda_{i+1})$, are output.

In step 90, a determination is made as to whether the last $\lambda_i$ value has been processed. If so, the process is finished. If not, processing proceeds to step 92.

In step 92, the next (i.e., the next highest) $\lambda_i$ value is selected, and processing returns to step 88.

Techniques for More Generalized Networks.

Figure 5:
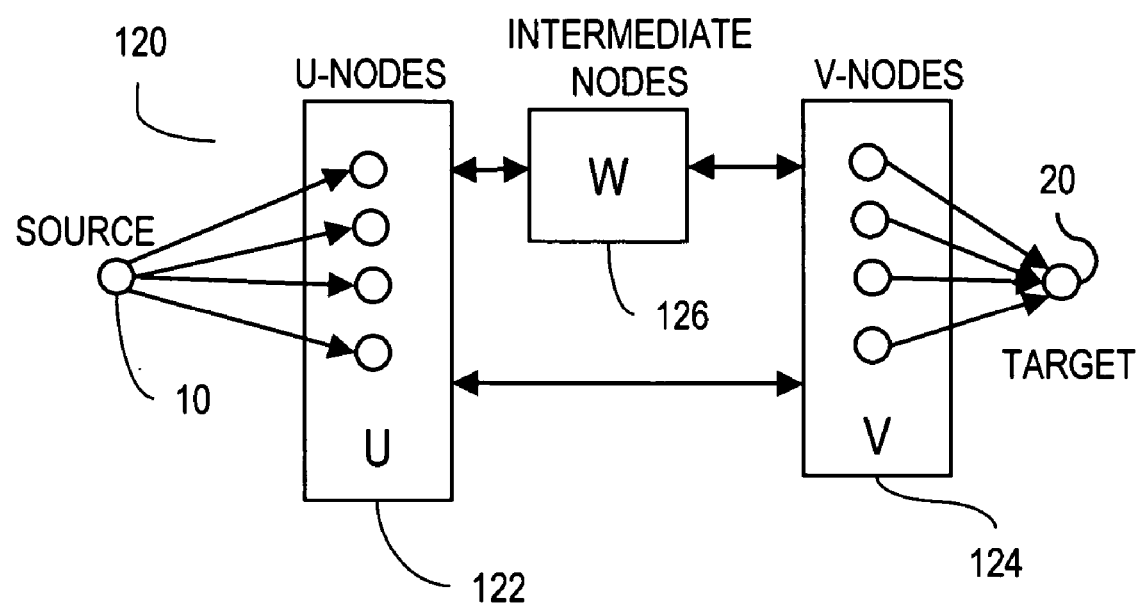
FIG. 5 is a block diagram representing a more generalized network which is processed according to certain representative embodiments of the present intention.

The technique described above can be generalized to networks 120 having the configuration shown in FIG. 5. In network 120, $N=\{s,t\}\cup U\cup W\cup V$, and there are no arcs between vertices within U 122 or vertices within V 124. Thus, network 120 is similar to network 5, but includes nodes W 126 between nodes U 122 and nodes V 124.

Figure 6:
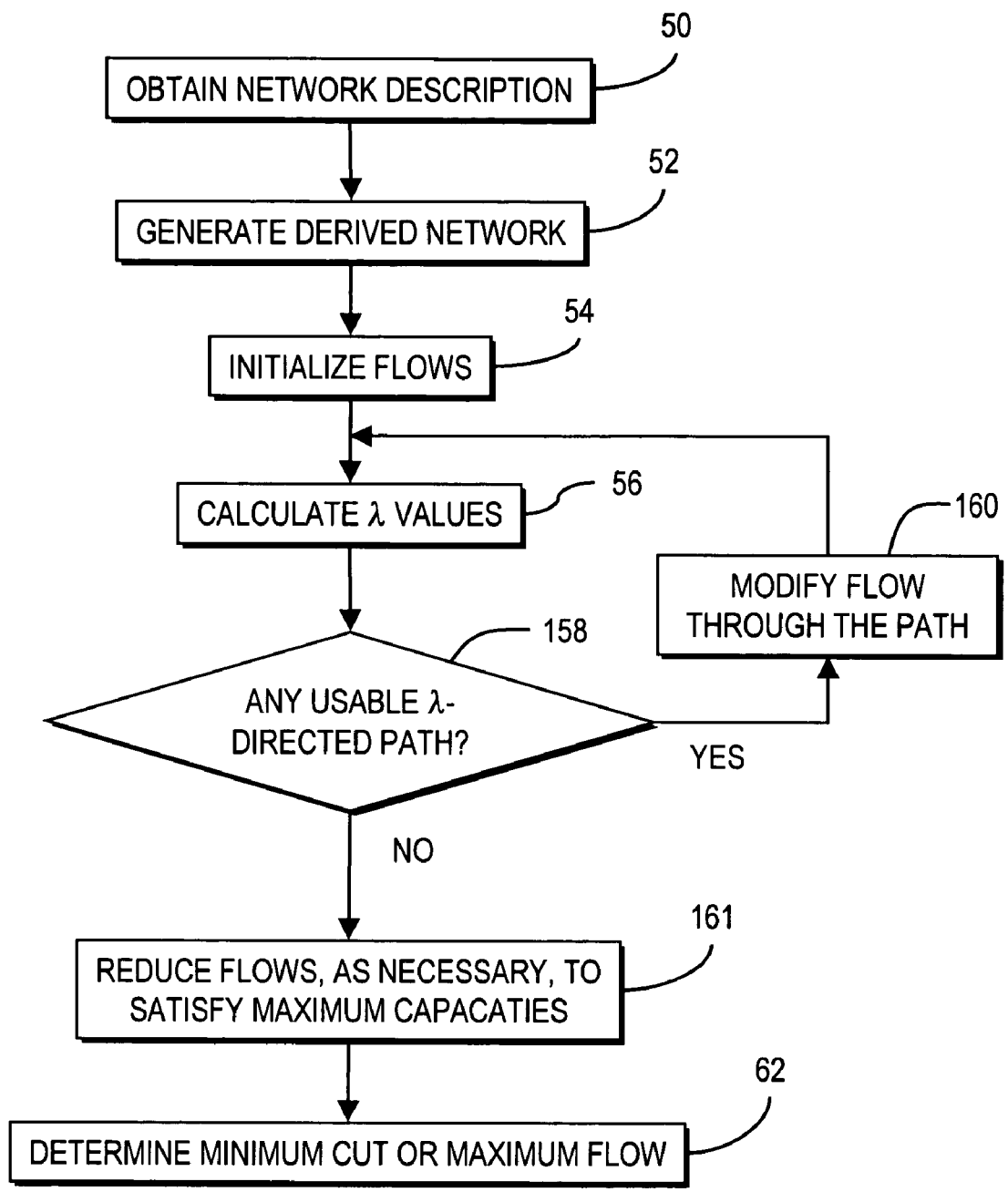
FIG. 6 illustrates a flow diagram for describing a technique, according to a representative embodiment of the present invention, for determining a minimum cut of, or the maximum flow through, the more generalized network illustrated in FIG. 5.

FIG. 6 illustrates a flow diagram for describing a technique, according to a representative embodiment of the present invention, for determining a minimum cut of or the maximum flow through a network 120 having the configuration illustrated in FIG. 5.

Initially, in step 50 a network description Ω is obtained. This step was described above in connection with the discussion of FIG. 3.

In step 52, a derived network $\overline{\Omega}$ is generated, as described above in connection with the discussion of FIG. 3.

In step 54, flows through the derived network are initialized. Again, this step is identical to be identically numbered step described above in connection with the discussion of FIG. 3.

In step 56, a λ value is calculated for each conduit that was replaced in step 52. This step also is identical to be identically numbered step described above in connection with the discussion of FIG. 3.

In step 158, a determination is made as to whether there exists any usable λ-directed residual path, $s \rightarrow u_i \rightarrow w_{k_j} \rightarrow \ldots \rightarrow w_{k_t} \rightarrow v_l \rightarrow t$, such that $\lambda_{s,i} < \lambda_{l,t}$ or $\lambda_{s,i} > \lambda_{l,t}$.

If any such usable λ-directed residual path is identified, then processing proceeds to step 160 (with respect to any one of such paths, if multiple such paths have been identified). Otherwise, processing proceeds to step 161.

In step 160, flow quantity through the path identified in step 58 is modified, preferably using a push technique similar to that described above in connection with the discussion of FIG. 3. In the present embodiment:

if $\lambda_{s,i} < \lambda_{l,t}$, push $\delta$flow=min$\{\hat{c}_{path}, \delta f_{i,l}\}$ from s to t through the augmenting path; or if $\lambda_{s,i} > \lambda_{l,t}$, push $\delta$flow=min$\{\hat{c}_{reversed\_path}, -\delta f_{i,l}\}$ from t to s through the reversed path ($\delta f_{i,l} < 0$ in this case), where $\delta f_{i,l}$ is the amount of flow that makes the two new lambda values equal after the push if the push is not constrained by the residual capacity: $c_{s,i}^{-1}(\bar{f}_{s,i} + \delta f_{i,l}) = c_{l,t}^{-1}(\bar{f}_{l,t} + \delta f_{i,l})$. $\delta f_{i,l}$ depends only on the two ends and is independent of the middle part of the path. Upon completion of this step, processing returns to step 56 to modify the λ values based on the new flows.

In step 161 (which is executed after it is determined that no usable λ-directed residual path remains), any flows that violate capacity constraints are reduced to the corresponding maximum capacity. The effects of such reductions are propagated downstream in a straightforward manner so as to reduce the downstream flows correspondingly. Once again, in the present embodiment the repetition of modifying flows and recalculating λ values is repeated until there no longer is any usable λ-directed residual path. However, in an alternate embodiment a different condition is specified for terminating such repetition.

Upon completion of step 161, the desired (or final) state of the derived network, in the present embodiment of the invention, has been obtained. Accordingly, in step 62, the minimum cut or maximum flow of the original network Ω is determined. Preferably, a technique such as that described above in connection with FIGS. 3 and 4 is used for this purpose.

System Environment.

Generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software and/or circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set and/or a printer), one or more input devices (such as a mouse, touchpad, tablet, touch-sensitive display or other pointing device; a keyboard, a microphone and/or a scanner), a mass storage unit (such as a hard disk drive), a real-time clock, a removable storage read/write device (such as for reading from and/or writing to RAM, a magnetic disk, a magnetic tape, an opto-magnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological and/or chemical processing.

Additional Considerations.

As discussed in detailed above, the present invention utilizes an approach that is significantly different than the conventional techniques for determining maximum flow through, or minimum cut of, a network. By using this approach, the entire set of relationships between minimum cut and/or maximum flow, on the one hand, and the potential parameter values, on the other, often can be obtained very quickly.

In the embodiments described above, an assumption is made that the capacities of the conduits are strictly monotonically increasing or strictly monotonically decreasing functions of a parameter λ. In alternate embodiments, such an assumption is not necessary. For example, in certain embodiments the assumption of monotonic increases is replaced with an assumption that the function is monotonically non-decreasing, and the assumption of monotonic decreases is replaced with an assumption that the corresponding function is monotonically non-increasing. Such embodiments, arise, e.g., where capacities are discontinuous functions of λ. In such cases, the technique described above is modified such that, when taking the inverse capacity functions, both endpoints of the range that results are saved and subsequently examined for the purpose of identifying potential λ-directed residual paths.

Upon identification of the minimum cut or the maximum flow, according to any of the techniques described above, subsequent steps preferably are taken to utilize such results. The nature of such steps typically will depend upon the problem that is desired to be solved, but generally will involve implementing an action plan for constructing or modifying a physical network or system. For example, if the network corresponds to the open-pit mining problem, then a mining plan in accordance with the minimum-cut solution preferably is implemented. Alternatively, if the network corresponds to a problem of identifying an optimal set of products to manufacture or purchase, a production plan in accordance with the minimum-cut solution preferably is implemented. Still further, if the network corresponds to an actual physical network or system, then the corresponding physical network or system preferably is constructed or modified in accordance with the results achieved pursuant to the technique of the present invention.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of identifying a state of flow through, or a cut of, a parameterized network, comprising:
   (a) obtaining a description of a network for conducting flow through a plurality of nodes interconnected by conduits, the conduits having specified capacities, at least some of said specified capacities being dependent upon a specified parameter λ;
   (b) generating a derived network by replacing λ-dependent capacities in the network with at least one λ-independent value;
   (c) manipulating flows through the derived network to obtain a final state for the derived network; and
   (d) identifying, by a computer, at least one of a cut of or a state of flow through the network based on the final state of the derived network.

2. A method according to claim 1, wherein each conduit n in the derived network having a capacity that was replaced in step (b) is assigned a value $\lambda_n$, and wherein the $\lambda_n$ collectively define breakpoints for identifying a specified cut of the network as λ, varies.

3. A method according to claim 2, wherein the specified cut is a minimum cut of the network.

4. A method according to claim 3, wherein the minimum cut of the network is determined, for any selected value of λ, by selecting nodes based on comparisons of the value of the selected value of λ against the various $\lambda_n$.

5. A method according to claim 4, wherein the maximum flow of the network is determined by first identifying the minimum cut of the network and then summing up the capacities of the conduits that are cut by said minimum cut.

6. A method according to claim 2, wherein step (c) comprises calculating intermediate $\lambda_n$ values based on flow, increasing flow along permissible paths in a direction from a conduit having a lower $\lambda_n$ to a conduit having a higher $\lambda_n$, and recalculating the $\lambda_n$ values based on the modified flow.

7. A method according to claim 6, wherein the $\lambda_n$ for a given conduit n is determined by calculating $c_n^{-1}(f_n)$, where $c_n^{-1}(*)$ is an inverse of the λ-dependent capacity function $c_n(\lambda)$ for the conduit in the network that corresponds to conduit n in the derived network, and $f_n$ is the flow quantity through conduit n in the derived network.

8. A method according to claim 6, wherein the final state of the derived network is achieved only when it is no longer possible to increase flow along any permissible path in a direction from a conduit having a lower $\lambda_n$ to a conduit having a higher $\lambda_n$.

9. A method according to claim 2, wherein the $\lambda_n$ for a given conduit n is determined by calculating $c_n^{-1}(f_n)$, where $c_n^{-1}(*)$ is an inverse of the λ-dependent capacity function $c_n(\lambda)$ for the conduit in the network that corresponds to conduit n in the derived network, and $f_n$, is the flow quantity through conduit n in the derived network.

10. A method according to claim 2, further comprising a step of sorting the $\lambda_n$ values based on magnitude.

11. A method according to claim 1, wherein the network represents a model for optimizing revenue coverage.

12. A method according to claim 11, wherein the nodes comprise a u-node for each product currently being sold and a v-node for each historical sales transaction.

13. A method according to claim 1, further comprising a step of generating the description of the network based on a problem of selecting an optimal subset of components having potential costs and benefits, where each of a plurality of the potential benefits is only achieved by assembling an appropriate group of the components.

14. A method according to claim 1, further comprising a step of implementing a project plan based on the determination made in step (d).

15. A method according to claim 1, wherein the final state of the derived network is achieved only when there exists no further flow manipulation that will result in an improvement according to one or more specified criteria.

16. A method of determining a state of flow through, or a cut of, a parameterized network, comprising:
   (a) obtaining a description of a network for conducting flow through a plurality of nodes interconnected by conduits, the conduits having specified capacities, at least some of said specified capacities being dependent upon a specified parameter $\lambda$;
(b) generating a derived network by replacing $\lambda$-dependent capacities in the network with at least one $\lambda$-independent value;
(c) initializing a set of flows through the derived network;
(d) based on the set of flows, calculating a $\lambda_n$ value for each conduit n, selected from the conduits whose capacities were replaced in step (b);
(e) modifying the set of flows based on the $\lambda_n$ values;
(f) repeating steps (d)-(e), with step (d) taking into account the flow modification from step (e), until a specified condition is achieved, thereby obtaining a final state of the derived network; and
(g) identifying, by a computer, at least one of a cut of or a state of flow through the network based on the final state of the derived network.

17. A method according to claim 16, wherein step (e) comprises:
(i) identifying a path in the derived network through two of the conduits n having different $\lambda_n$ values, $\lambda_1$ and $\lambda_2$, respectively; and
(ii) increasing flow through the identified path in a direction from the lower of $\lambda_1$ and $\lambda_2$ to the higher of $\lambda_1$ and $\lambda_2$.

18. A method according to claim 17, wherein a quantity of the flow increase in step (e)(ii) is selected so as to equalize $\lambda_1$ and $\lambda_2$, subject to any other applicable constraints.

19. A method according to claim 18, wherein the specified condition is that there remains no path having different $\lambda_n$ values in which flow may be modified to reduce the difference between said different $\lambda_n$ values.

20. A method according to claim 16, wherein the network represents a model for optimizing revenue coverage.

21. A method according to claim 20, wherein the nodes comprise a u-node for each product currently being sold and a v-node for each historical sales transaction.

22. A method according to claim 16, wherein the flow originates at a source node, goes through a plurality of other nodes interconnected by conduits, and terminates at a target node.

23. A method according to claim 22, wherein:
(a) the other nodes include a plurality of u-nodes, each directly connected to the source node by a single conduit, referred to as a source conduit, and a plurality of v-nodes, each directly connected to the target node by a single conduit, referred to as a target conduit, with the source conduits and the target conduits collectively being referred to as terminus conduits, and
(b) only terminus conduits are dependent upon $\lambda$.

24. A method according to claim 16, wherein $\lambda_n$ is calculated for conduit n by calculating $c_n^{-1}(f_n)$, where $c_n^{-1}(*)$ is an inverse of the $\lambda$-dependent capacity function $c_n(\lambda)$ for the conduit in the network that corresponds to conduit n in the derived network, and $f_n$ is the flow quantity through conduit n in the derived network.

25. A method according to claim 16, further comprising a step of generating the description of the network based on a problem of selecting an optimal subset of components having potential costs and benefits, where each of a plurality of the potential benefits is only achieved by assembling an appropriate group of the components.

26. A method according to claim 16, further comprising a step of implementing an action plan based on the determination made in step (g).

27. A method according to claim 16, wherein the cut is a minimum cut of the network.

28. A method of determining a state of flow through, or a cut of, a parameterized network, comprising:
(a) obtaining a description of a network for conducting flow that originates at a source node, goes through a plurality of other nodes interconnected by conduits, and terminates at a target node, the conduits having specified capacities, at least some of said specified capacities being dependent upon a specified parameter $\lambda$;
(b) generating a derived network by replacing $\lambda$-dependent capacities in the network with at least one $\lambda$-independent value;
(c) initializing a set of flows through the derived network;
(d) based on the set of flows, calculating a $\lambda_n$ value for each conduit n, selected from the conduits whose capacities were replaced in step (b), wherein $\lambda_n$ is calculated for conduit n by calculating $c_n^{-1}(f_n)$, where $c_n^{-1}(*)$ is an inverse of the $\lambda$-dependent capacity function $c_n(\lambda)$ for the conduit in the network that corresponds to conduit n in the derived network, and $f_n$ is the flow quantity through conduit n in the derived network;
(e) identifying a path in the derived network through two of the conduits n having different $\lambda_n$ values, $\lambda_1$ and $\lambda_2$, respectively; and
(f) increasing flow through the identified path in a direction from the lower of $\lambda_1$ and $\lambda_2$ to the higher of $\lambda_1$ and $\lambda_2$, wherein a quantity of the flow increase is selected so as to equalize $\lambda_1$ and $\lambda_2$, subject to any other applicable constraints;
(g) repeating steps (d)-(f), with step (d) taking into account the flow modification from step (f), until no other path exists for attempting to equalize $\lambda_n$ values, thereby obtaining a final state of the derived network; and
(h) identifying, by a computer, at least one of a cut of or a state of flow through the network based on the final state of the derived network.

29. A method according to claim 28, further comprising a step of implementing a project plan based on the determination made in step (h).

30. An apparatus for determining a state of flow through, or a cut of, a parameterized network, comprising:
(a) means for obtaining a description of a network for conducting flow through a plurality of nodes interconnected by conduits, the conduits having specified capacities, at least some of said specified capacities being dependent upon a specified parameter $\lambda$;
(b) means for generating a derived network by replacing $\lambda$-dependent capacities in the network with at least one $\lambda$-independent value;
(c) means for manipulating flows through the derived network to obtain a final state for the derived network; and
(d) means for identifying, by a computer, at least one of a cut of or a state of flow through the network based on the final state of the derived network.

31. A computer-readable media and storing computer-executable process steps for determining a state of flow through, or a cut of, a parameterized network, said process steps comprising:
(a) obtaining a description of a network for conducting flow through a plurality of nodes interconnected by conduits, the conduits having specified capacities, at least some of said specified capacities being dependent upon a specified parameter $\lambda$;
(b) generating a derived network by replacing $\lambda$-dependent capacities in the network with at least one $\lambda$-independent value;

(c) manipulating flows through the derived network to obtain a final state for the derived network; and (d) identifying, by a computer, at least one of a cut of or a state of flow through the network based on the final state of the derived network.

32. An apparatus for determining a state of flow through, or a cut of, a parameterized network, comprising:

a processor for executing stored program instruction steps; and a storage device connected to the processor for storing the program instruction steps, wherein the program instruction steps include steps of:

(a) obtaining a description of a network for conducting flow through a plurality of nodes interconnected by conduits, the conduits having specified capacities, at least some of said specified capacities being dependent upon a specified parameter $\lambda$;

(b) generating a derived network by replacing $\lambda$-dependent capacities in the network with at least one $\lambda$-independent value;

(c) manipulating flows through the derived network to obtain a final state for the derived network; and (d) identifying, by a computer, at least one of a cut of or a state of flow through the network based on the final state of the derived network.

* * * * *

UNITED STATES PATENT AND TRADEMARK OFFICE
CERTIFICATE OF CORRECTION

| | |
|---|---|
| PATENT NO. | : 7,827,305 B2 |
| APPLICATION NO. | : 11/159454 |
| DATED | : November 2, 2010 |
| INVENTOR(S) | : Bin Zhang et al. |

It is certified that error appears in the above-identified patent and that said Letters Patent is hereby corrected as shown below:

In column 12, line 10, in Claim 2, delete "$\lambda$," and insert -- $\lambda$ --, therefor.

In column 12, line 41, in Claim 9, delete "$f_n$," and insert -- $f_n$ --, therefor.

Signed and Sealed this
Tenth Day of May, 2011

David J. Kappos
*Director of the United States Patent and Trademark Office*